(12) United States Patent
Drake et al.

(10) Patent No.: US 11,941,896 B1
(45) Date of Patent: Mar. 26, 2024

(54) SYSTEM AND METHOD FOR ALERTING AND MONITORING HEALTH AND WELLNESS CONDITIONS OF AN INDIVIDUAL WITHIN A DEFINED ENVIRONMENT

(71) Applicant: KISMET TECHNOLOGIES LLC, Winter Park, FL (US)

(72) Inventors: Christina Drake, Winter Park, FL (US); Christopher Yakymyshyn, Seminole, FL (US)

(73) Assignee: Kismet Technologies Inc., Orlando, FL (US)

( * ) Notice: Subject to any disclaimer, the term of this patent is extended or adjusted under 35 U.S.C. 154(b) by 373 days.

(21) Appl. No.: 17/326,324

(22) Filed: May 20, 2021

Related U.S. Application Data

(60) Provisional application No. 63/027,846, filed on May 20, 2020.

(51) Int. Cl.
*G06V 20/59* (2022.01)
*G08B 21/02* (2006.01)

(52) U.S. Cl.
CPC .......... *G06V 20/593* (2022.01); *G06V 20/597* (2022.01); *G08B 21/0211* (2013.01)

(58) Field of Classification Search
CPC . G06V 20/593; G06V 20/597; G08B 21/0211
See application file for complete search history.

(56) References Cited

U.S. PATENT DOCUMENTS

| | | | |
|---|---|---|---|
| 2014/0276090 A1* | 9/2014 | Breed | A61B 5/1455 600/473 |
| 2017/0158186 A1* | 6/2017 | Soifer | B60H 1/00742 |
| 2017/0291544 A1* | 10/2017 | Ishihara | G06F 3/013 |
| 2018/0319279 A1* | 11/2018 | Ikeda | G06V 20/597 |
| 2019/0053748 A1* | 2/2019 | Sugiyama | B60N 2/002 |
| 2019/0285747 A1* | 9/2019 | Yakymyshyn | G01S 17/06 |
| 2019/0391581 A1* | 12/2019 | Vardaro | A61B 5/02055 |
| 2021/0209927 A1* | 7/2021 | Hedges | G08B 25/005 |
| 2021/0394775 A1* | 12/2021 | Julian | G08G 1/164 |

FOREIGN PATENT DOCUMENTS

| | | | | |
|---|---|---|---|---|
| CN | 106485232 A | * | 3/2017 | ......... G06K 9/00248 |
| DE | 102006003071 A1 | * | 8/2007 | ......... B60H 1/00742 |
| JP | H10114479 A | * | 5/1998 | |

(Continued)

*Primary Examiner* — Carol Wang
(74) *Attorney, Agent, or Firm* — Terry M. Sanks, Esq.; Beusse Sanks, PLLC

(57) ABSTRACT

A system including a respiration detection device configured to detect respiration of an individual within a defined environment regardless of a position of the individual within the defined environment wherein detection is performed at a location unobstructed by a physical barrier within the defined environment, a processor with non-transitory computer readable medium configured to evaluate respiration data from the respiration detection device to determine the individual based on a location of the individual within the defined environment and a notification device to provide notification when the individual is detected in the defined environment after at least one of a defined time period and a reduction in respiration. A method is also disclosed.

19 Claims, 8 Drawing Sheets

1100 detecting individual respiration of an individual, with a respiration detection device, within a defined environment regardless of a position of the individual within the defined environment wherein detection is performed at a location unobstructed by components within the defined environment with a respiration detection device

1110 determining placement of the individual within the defined environment with an image detection device

1120 evaluating respiration data gathered by the respiration detection device to determine an individual within the defined environment

1130 notifying when the individual is detected in the defined environment after at least one of a defined time period and a reduction in respiration.

1140

(56) References Cited

FOREIGN PATENT DOCUMENTS

| | | | | |
|---|---|---|---|---|
| JP | 2006042903 | A | * | 2/2006 |
| JP | 6171718 | B2 | * | 8/2017 |
| JP | 2018060487 | A | * | 4/2018 |
| JP | 2019037397 | A | * | 3/2019 |
| KR | 20190131840 | A | * | 11/2019 |
| WO | WO-2017198459 | A1 | * | 11/2017 ........... A61B 5/0205 |

* cited by examiner

| 2D Plume Detection | | | |
|---|---|---|---|
| Person Type ID | Resp. Rate Range (Breaths/Min) | Resp. Position Longitudinal (cm) | Resp. Position Angle (deg from centerline) |
| Infant | 35 to 57 | 125 | -15 |
| Toddler | 22 to 34 | 125 | 15 |
| Adult | 12 to 21 | 50 | -45 |
| Driver | 12 to 21 | 50 | 45 |

| Camera - Image Processing | | |
|---|---|---|
| Seat Belt ID | Forward Facing | Gaze |
| Edge Detection | Centroid Detection** | Area and ratio**** |
| N/A | N/A | N/A |
| N/A* | N/A*** | N/A |
| 135 deg | detect | N/A |
| 45 deg | detect | delta(A**) and delta(**/plume) |

*5 point harness
**closed curve plane at spacing
***detect if * used
****Area of closed curve plane and ratio of centroid positioning to plume positioning

900

Performing a breath detection scan in an upper portion of a vehicle cabin with a light source upon entering a vehicle with a respiratory detection device.
910

If the vehicle engine is not engaged, after a given time period or after a temperature in the vehicle cabin exceeds a set limit, activating an alarm system.
920

Performing an image detection to further confirm a type of individual in the vehicle cabin upon the vehicle engine being engaged.
930

If at least one of an infant and toddler are detected upon the vehicle engine being disengaged after use, activating an alarm.
940

| detecting individual respiration of each individual within a defined environment regardless of a position of each individual within the defined environment wherein detection is performed at a location unobstructed by components within the defined environment with a respiration detection device |

1010

| determining at least one of seatbelt usage, driver being distraction and driver drowsiness with an image detection device |

1020

| at least one of evaluating respiration data to determine a type of individual within the defined environment, seatbelt usage, whether a driver is distracted and driver drowsiness with a processor having non-transitory computer readable medium |

1030

| notifying when at least one of an individual is detected in the defined environment after at least one other individual has left the defined environment, improper seatbelt usage, driver distraction and driver drowsiness. |

1110 — detecting individual respiration of an individual, with a respiration detection device, within a defined environment regardless of a position of the individual within the defined environment wherein detection is performed at a location unobstructed by components within the defined environment with a respiration detection device 1120 — determining placement of the individual within the defined environment with an image detection device 1130 — evaluating respiration data gathered by the respiration detection device to determine an individual within the defined environment 1140 — notifying when the individual is detected in the defined environment after at least one of a defined time period and a reduction in respiration.

FIG. 11

SYSTEM AND METHOD FOR ALERTING AND MONITORING HEALTH AND WELLNESS CONDITIONS OF AN INDIVIDUAL WITHIN A DEFINED ENVIRONMENT

PRIORITY TO RELATED APPLICATIONS

This application is entitled to the benefit of U.S. provisional patent application No. 63/027,846 filed May 20, 2020, incorporated by reference.

BACKGROUND

Embodiments relate to detection and alarm systems and, more particularly, to a system to detect an individual within a defined environment regardless of position or location of the individual and to determine environmental conditions within the defined environment.

Much can be learned when analyzing an individual's breath and other environmental conditions within a closed or defined environment. For example, every year, children are left in unattended vehicles which can lead to heat stroke injury or death. In 2019, more than 50 children died from vehicular heat stroke in the United States. Heat stroke occurs when a person's core body temperature rises above 104° F. Heat stroke is the most severe form of heat injury and constitutes a medical emergency. When a person's core body temperature rises to 107° F., this is lethal and will result in death without immediate attention. A child's body temperature rises roughly three times faster than an adult's body temperature. Because of this, children and babies are far more susceptible to heat stroke when left unattended in a vehicle, especially in the summer months.

In a 2012 study published by the National Highway Traffic Safety Administration, prior art solutions considered to reduce children being left unattended in a vehicle required considerable effort from a user/caregiver to ensure smooth operation, and use was not consistent. The report further concluded that technology was needed that had improved performance and limited actions that must be taken by the user/caregiver in using the technology. Many newer technologies that have been introduced to address vehicular heatstroke still have user requirements that fall into the same pitfalls mentioned in this 2012 NHTSA report.

Texas Instruments recently released a new product called Vehicle Occupant Detection Sensor (TI Product AWR 1642) which is a contactless approach to identifying a person in a vehicle. However, a perceived limitation of this sensor is that it is effective primarily for forward facing properly seated occupants which can create a false negative. This sensor does not address the critical need of children who are rear facing in the vehicle or children who enter the vehicle, but do not sit in the seat or stand in a zone or field of view of this sensor. Furthermore, the sensor may also detect persons on the outside of the passenger windows, thus creating a false positive. This results in a possible scenario where the sensor goes off in situations where someone walks by the vehicle, such as in a parking lot or parking garage. Thus, though this prior art reference improves on prior state of the art, it still does not provide high enough sensor fidelity in terms of accurate detection to make it desirable to the end user for continual use.

Another non-contact prior art, provided by Senseair, uses cumulative carbon dioxide ($CO_2$) amounts in an enclosed vehicle. While this prior art can identify a person, it does not distinguish the source of $CO_2$ which may occur from sources other than a person. Additionally, the present inventor has found that this sensor has a lag time of roughly one minute which can make a meaningful difference of injury or death in the summer months to children unintentionally left behind in a vehicle.

Yet another non-contact prior art, provided by Yayyar Corporation, utilizes a millimeter wave phased array RADAR chip for monitoring passenger compartments to detect people or pets in a vehicle. The technology uses software for detection of changes in RADAR signatures over time to infer the presence of a breathing occupant and catalog the breathing rate and physical size of each occupant. Because of the RF frequency used, the sensor is able to detect occupants hidden behind nonconductive structures such as seat, blankets, etc. However, the instant inventor believes this prior art's solution infers the presence of an occupant from small movements of surfaces and may suffer from false positives and false negatives because of the indirect occupant detection scheme used.

Other prior art has been found to rely on physical contact with the seat or child and for the driver/user to manually engage a sensor or system activation device. Such prior art is believed to be unreliable depending on the type utilized. Yet others utilize eye tracking or gaze tracking devices, image only based devices, door logic devices, or motion sensors (such as, but not limited to, ultrasonic transducer to detect motion in a back seat). The present inventors have found that each of these prior art devices used alone produces a high rate of error when detecting if an infant or child is left within a vehicle.

Though a vehicle is one form of a defined or closed environment, other defined environments exist that do not involve a vehicle. For examples, within a residence, or place of business, being able to ascertain information from an individual's breath plume may be used to determine if the individual is experiencing an illness which may be contagious to others in at a specific location such, as but not limited to, COVID-19.

Vehicle manufacturers and users of vehicles would benefit from a system and method that can detect individual entities in a vehicle, regardless of their placement or location within the vehicle, while also detecting occupant conditions within the vehicle which could negatively affect a driver of the vehicle and initiating alarms or indicators as needed to make a user aware of an adverse situation or condition.

SUMMARY

Embodiments relate to a system and a method for detecting an individual within a defined environment and providing a notification that conditions are not safe within the defined environment. The system comprises a respiration detection device configured to detect respiration of an individual within a defined environment regardless of a position of the individual within the defined environment wherein detection is performed at a location unobstructed by a physical barrier within the defined environment. The system further comprises a processor with non-transitory computer readable medium configured to evaluate respiration data from the respiration detection device to determine the individual based on a location of the individual within the defined environment. The system also comprises a notification device to provide notification when the individual is detected in the defined environment after at least one of a defined time period and a reduction in respiration.

The method comprises detecting individual respiration of an individual, with a respiration detection device, within a defined environment regardless of a position of the individual within the defined environment wherein detection is performed at a location unobstructed by components within the defined environment with a respiration detection device. The method further comprises determining placement of the individual within the defined environment with an image detection device. The method also comprises evaluating respiration data gathered by the respiration detection device to determine an individual within the defined environment. The method further comprises notifying when the individual is detected in the defined environment after at least one of a defined time period and a reduction in respiration.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 9 shows an embodiment of a method;

FIG. 10 shows another embodiment of a method;

FIG. 11 shows another embodiment of a method; and

DETAILED DESCRIPTION

Figure 1:
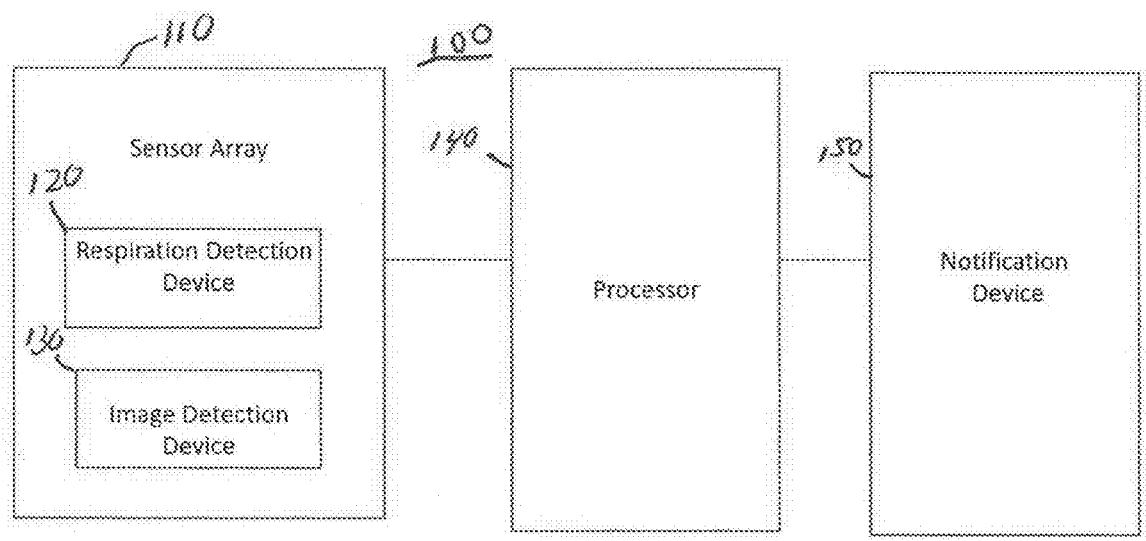
FIG. 1 shows an embodiment of a monitoring and alert system.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Though inside of a vehicle is identified in the figures as the defined area or environment, the embodiments disclosed herein are not in any manner limited to only being operable within a vehicle. The defined area may be a certain distance from an individual regardless of location of the individual. As non-limiting examples, the individual may be in an open space such as, but limited to, a park, within a room, warehouse, etc. However, when in an open space place of the embodiments disclosed herein with respect to where an individual is anticipated is in close proximity. At a minimum, the defined environment is a closed area or space, meaning there is structure defining each side of the area, space or environment. Thus, as a non-limiting example, the defined environment may be a room, booth or any other structure. Even within a space that may be defined by walls, openings may be provided. As a non-limiting example, the defined environment in a cabin area within a vehicle is not limited to having closed windows within the vehicle as the windows may be opened or closed.

FIG. 1 shows an embodiment of a monitoring and alert system. The system 100 provides for a sensory array 110 comprising at least a respiration detection device 120 that may be provided in conjunction with an image detection device 130. Both devices, either collectively or individually may detect a presence of a person, or individual, within a defined environment along with other safety issues relative to the defined environment, some disclosed herein whereas other are known to those skilled in the art with respect to the defined environment. Coupled to the respiration detection device 120 is the image detection device 130 used to confirm information about the individual, such as, but not limited to, positioning of occupants, seatbelt usage, driver distraction and drowsiness when the defined environment is at least a cabin within a vehicle. The respiration detection device 120 may also be configured to detect carbon dioxide levels that could lead to lower cognitive performance by the individual, or driver, of the vehicle. The respiration detection device 120 may operate by detecting a breath plume 310 (shown in FIG. 3) above a head of the individual. Thus, the respiration detection device 120 may be positioned to monitor an upper region of the defined environment. Because of the real-time detection and notification, the system 100 provides a more comprehensive response to vehicle occupant safety than what is currently available and immediately addresses the critical need of alerting for children left in vehicles.

A processor 140 is also disclosed and is discussed further below. As an overview to the further details herein, the processor 140 with non-transitory computer readable medium (shown in FIG. 12) may be configured to evaluate respiration data from the respiration detection device 120 to determine a type of each individual based on a location of the individual within the defined environment and to evaluate image data to determine information about the individual, such as, but not limited to at least one of seatbelt usage, driver distraction and driver drowsiness when the defined environment is the cabin of the vehicle.

Depending on when an issue is identified, the processor 140 may provide a signal to a notification device 150. The notification device 150 may be within the processor 140 which then is connected to an alarm system of the vehicle. The notification device 150 may also be a separate unit. As described, the alarm system of the vehicle is not considered a part of the system. Instead, the system disclosed herein may connect to the vehicle alarm system. In another embodiment disclosed herein, the notification device may communicate to a computer application such as, but not limited to, a mobile application on a smartphone or another remote computing device (such as may be eventually dispatched to a governmental emergency response unit).

Figures 2A, 2B, 2C:
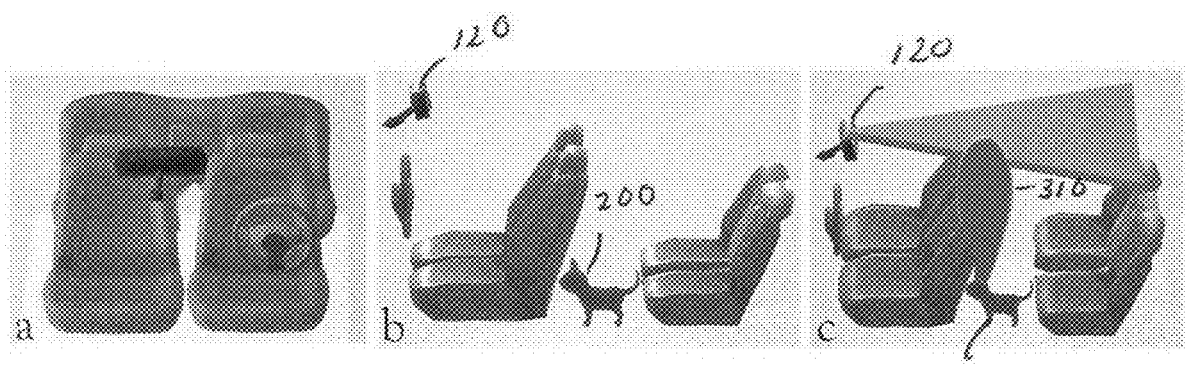
FIGS. 2A-2C show an embodiment of how the respiration detection device functions.

FIGS. 2A-2C show an embodiment of how the respiration detection device functions. As shown, the system 100 may be located above a seating area of the vehicle such as, but not limited to, next to or as part of a rearview mirror. The image detection device 130 may be located in the same area or at another location. As shown in FIG. 2B, a living entity, the individual, may be within the vehicle. The living entity is not limited to humans, as the living entity may also be an animal such as, but not limited to, a pet. Thus, when specifically discussing an infant, child or toddler herein, the embodiments are also applicable to any living entity that periodically exhales carbon dioxide such as, but not limited to, a pet.

As shown further in FIG. 2C, the system 100 does not require line of sight of the individual for the respiration detection device 120 to detect respiration from the individual. Breathing plumes (breathing heartbeats) 310 may be used for both identification of persons and person type (infant, toddler, and adult). The respiration detection device 120 may be directed to monitor a top area or section of the cabin of the vehicle as carbon dioxide from living entities rise. The top of the cabin is an area that is unobstructed by vehicle seats or other vehicle components.

Figure 3:
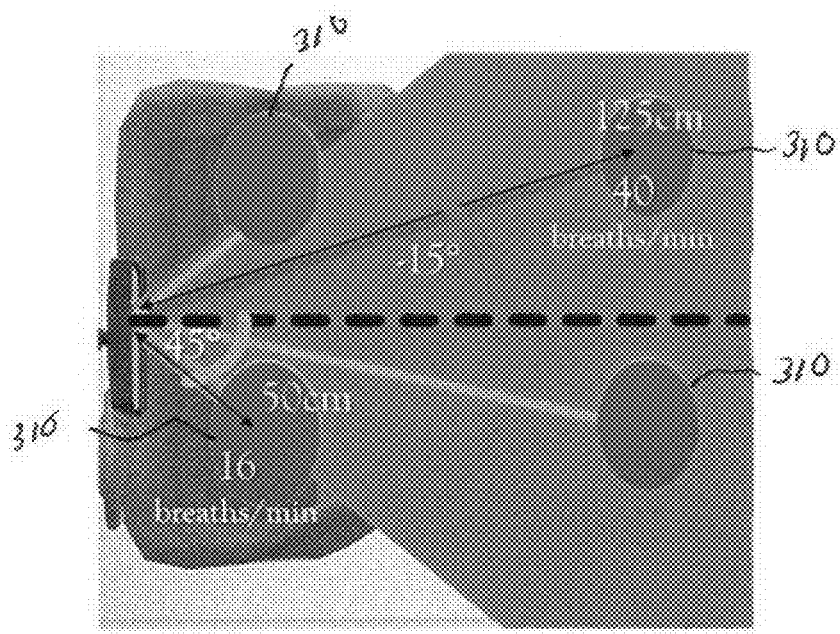
FIG. 3 shows a top view of the respiration detection device monitoring a vehicle's cabin.

FIG. 3 shows a top view of the respiration detection device monitoring a vehicle's cabin. As shown, utilizing the processor 140, a 2D map of positions of individuals 210 within the vehicle may be created. Specifically, breathing plumes (breathing heartbeats) 310 may be used for both identification of persons and person type (infant, toddler, and adult) and to create a 2D map of each individual's position within the vehicle. As shown, a location of each entity is identified. Each seating area may be designated as a zone wherein entity location may be identified by zone, such as but not limited to Zone 1, Zone 2, Zone 3, etc.

Figure 4:
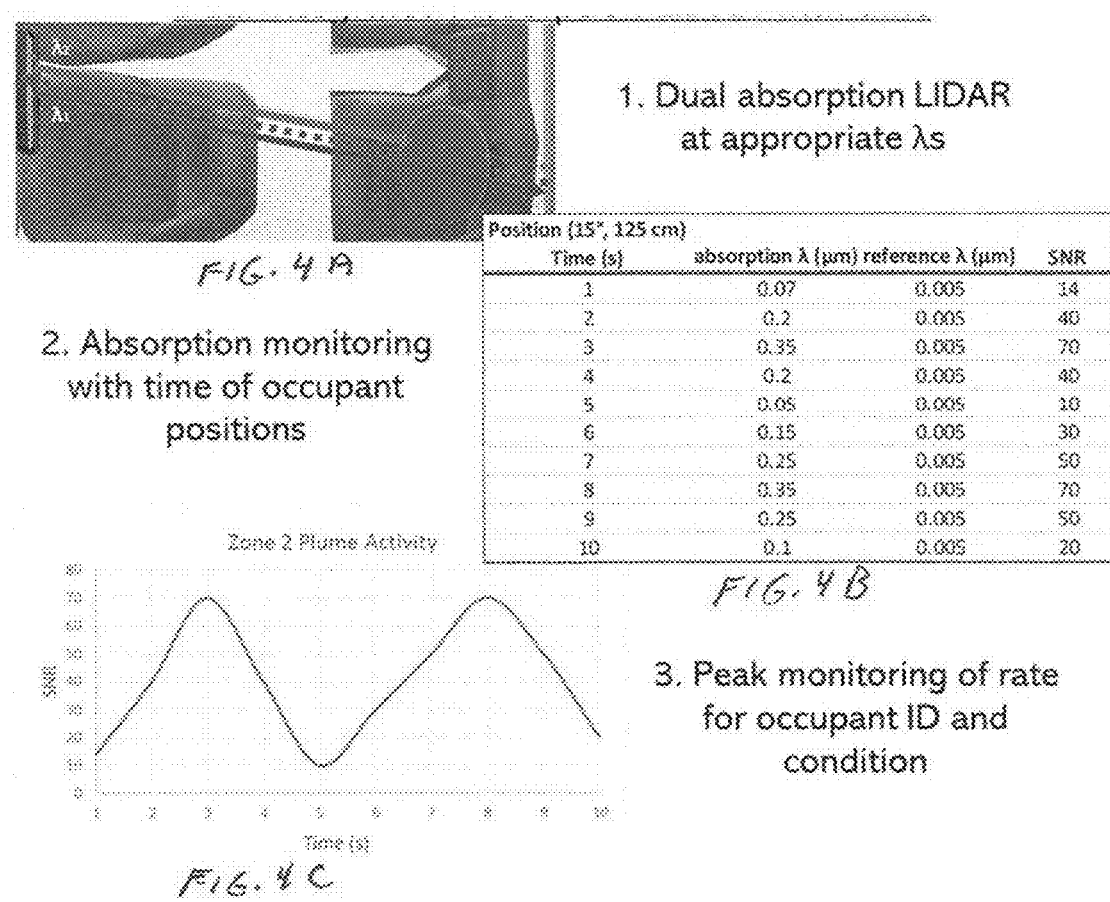
FIGS. 4A-4C show a process flow for the respiration detection device.

FIGS. 4A-4C show a process flow for the respiration detection device. As shown in FIG. 4A, differential absorptions at designated optical wavelengths are measured. FIG. 4B shows a chart representative of the measurements taken. As further shown in FIG. 4A, lambda 1 is a reference wavelength and lambda 2 is an absorption wavelength. Based on dividing the absorption at lambda 2 by the absorption at the reference lambda 1 at the same time frame, a signal to noise ratio is determined. FIG. 4C shows monitoring the rate of respiration of an occupant in a particular angular detection zone based on the change in the signal noise ratio at a sequential set of times. This is done by measuring a period of time between peaks in the above-mentioned signal to noise ratio, the respiration rate of the respirating subject may be calculated and compared with typical respiration rates of classes of subjects to determine the type of subject being detected. This is based on absorption strength for $CO_2$ at a given wavelength in near infrared (NIR) relative to an off peak (non-absorbing $CO_2$ NIR wavelength) at a fixed distance (Beer-Lambert). The SNR is estimation of return power ration of the 2 wavelengths.

Figures 5, 6:
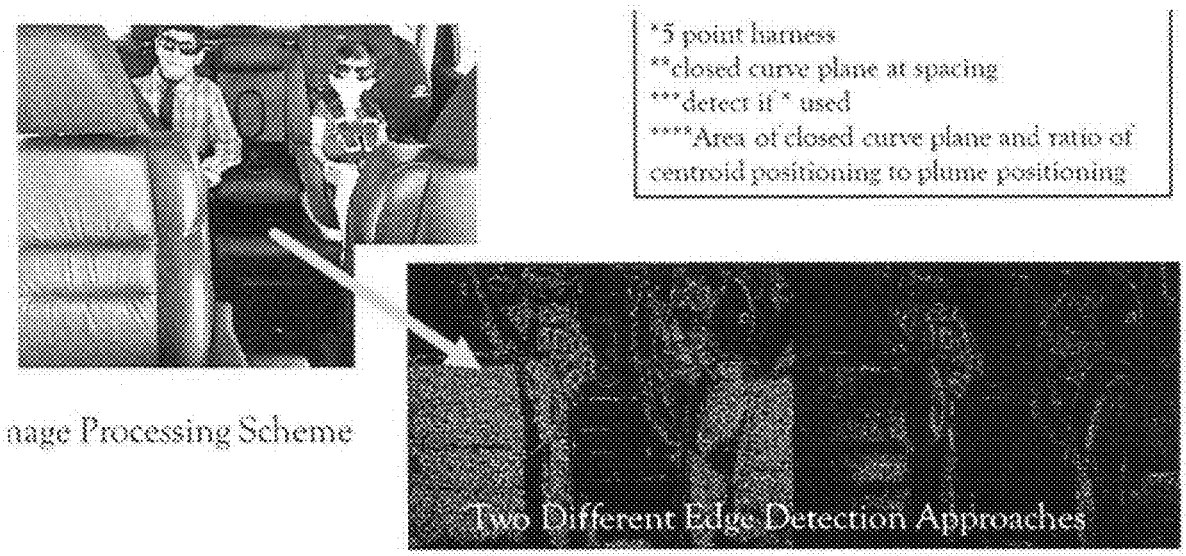
FIG. 5 shows a table of respiration plume detection.
FIG. 6 shows two different images taken by the imaging detection device.

FIG. 5 shows a table of respiration plume detection. Respiration rates based on type of person are drastically different based on person type and easily distinguished. Breathing heartbeat detection may be based on dual integrated absorption Light Detection and Ranging (LIDAR) (collectively DIAL) which is used in atmospheric scanning and in exhaust scanning. LIDAR is a method for measuring distances by illuminating the target with laser light and measuring the reflection with a sensor. However, though based on the DIAL principle where the light source is usually a laser, a laser is not preferred in the embodiments disclosed herein. Instead, a light source such as, but not limited to, a light emitting diode (LED) may be the illumination device. A non-laser light source is preferable to avoid potential safety concerns associated with laser light sources. Thus, the system is not constrained or limited by occupant size, apparel worn, posture, whether the occupant is in a secondary safety seat, moving or stationary occupants, forward facing or rear facing occupants, and is also not dependent on lighting conditions. As further shown in the table of FIG. 5, a longitudinal distance and angular distance from a centerline from the respiration detection sensor are determined.

In addition to detecting respiration rates, this information may be used to determine lung capacity over time. Therefore, if the processor determines a decrease in lung capacity, such as, if measured over a given time period, notification may be provided. The time period may be a continuous period once detection has begun, until the individual leaves the defined environment. This time period may be determined based on weather conditions such as, but not limited to, temperature humidity, etc., within the defined environment or a defined time for the individual to be within the defined environment. Thus, as discussed herein, environmental sensors may also be part of an embodiment disclosed herein or the environmental sensor may be part of another system in use with the defined environment. In another embodiment, the time period may be pre-programmed within the environments disclosed herein wherein the time period may be associated with a type of individual detected, though not required.

FIG. 6 shows two different images taken by the imaging detection device. Using specific types of information from the camera-based imaging device 130, in combination with the respiration detection device 120, several conditions of the occupant can be simultaneously assessed. For example, the 2D breath plume may identify an adult in the backseat of the vehicle on the right side of the vehicle. The image detection device 130 may then use that criteria to detect a seatbelt at approximately 135 degrees for correct use. Positioning is determined by detection of 2 curved closed planes (for eyes or eyewear) and their centroid, relative to the positioning of the person's breathing heartbeat in 2D space, to determine if the person is facing forward and seated correctly in their seat. For the driver, this analysis may be extended to relative movement of their centroid to the center position of their breathing plume, as well as changes in breathing rate, to detect if they are distracted or drowsy. These calculations, or determinations, may be made with the processor 140.

Also considering FIG. 6, geometric aspects of the individual may be determined with the embodiments disclosed herein. Such geometric aspects may include whether the individual has their head in a downward angle, whether the individual is sneezing or coughing, whether the individual has a turned head, etc. Hence, the embodiments disclosed herein can monitor head motion.

Figure 7:
FIG. 7 shows a table of image data.

FIG. 7 shows a table of image data. As shown, seat belt detection may be provided using edge detection. More specifically, edge detection includes a variety of mathematical methods that aim at identifying points in a digital image at which the image brightness changes sharply or, more formally, has discontinuities. The points at which image brightness changes sharply are typically organized into a set of curved line segments termed "edges."

Centroid detection may also be used where 2 close curved planes in a certain proximity may be detected in an image such as, but not limited to, eyeglasses, sunglasses, eyeballs, eyebrows, etc. A centroid or center point lines is identified with where a nose of an entity is identified as this is where respiration of the individual is released.

Only forward-facing individuals may be visible in an image. Therefore, infants, who should be in a rear facing car seat, are not visible. However, for an infant, a determination of rear facing may be made. For toddlers, using either edge detection or centroid detection, a check for a 5-point harness as well as a single-point seatbelt may be performed. When not facing the camera, geometry may be used to identify a back seat person. More specifically, with respect to infants, it can be confirmed that they are rear-facing by lack of return data for both seat belt and approximation of eye level. Toddlers can be either rear-facing or forward-facing. However, if a toddler is under the age of three (3), they should be in a 5-point harness. The search would verify that the toddler is rear-facing or search for geometry consistent with a 5-point harness.

Figure 8:
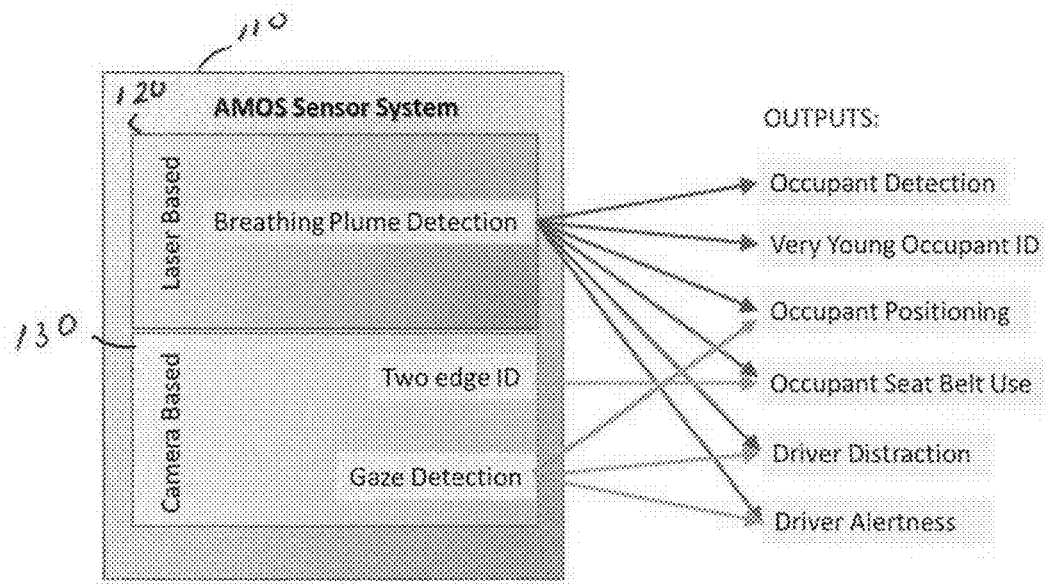
FIG. 8 shows another embodiment of the system.

FIG. 8 shows another embodiment of the system. The sensor system 110 has the respiratory detection device that may be based on DIAL. As disclosed above, since the light is illuminated within a cabin of the vehicle, an LED may be used as the light source for the DIAL detection device. The image detection device 130 may also be part of the sensor system or array 110. The image detection device 130 may be camera. Various outputs from the respiratory detection device 120 and the image detection device 130 are available where the image may be based on two edge identification and/or gaze detection. The outputs from the respiratory detection device 120 may comprise occupant detection, very young occupant identification, occupant positioning, occupant seat belt use, and driver distraction. The outputs from the image detection device 130 may comprise occupant positioning, occupant seat belt use, driver distraction and driver alertness. These outputs are provided to the processor 140. The processor 140 may then activate an alert or warning device 150, as needed.

In operation, to determine whether a child is unexpectedly left in the vehicle, while the vehicle is not in operation, the system may scan for persons whenever a vehicle door is opened. By doing so, the system can detect an event where a child enters the vehicle without an adult or when a child is left in the vehicle.

The warning or alarm device (notification device) 150 is non-limiting. As a nonlimiting example, the processor 140 may communicate a notice or warning to a mobile device (shown in FIG. 12) of an occupant or owner of the vehicle. Thus, in this embodiment, the system 100 described herein may work with a mobile application or may dial the cell phone of an authorized recipient where either an alarm or prerecorded message is communicated. In another non-limiting example, the processor 140 may activate an alarm system on the vehicle, such as when a child or animal is detected in the vehicle after the driver has exited the vehicle. This arm may be activated within seconds to minutes after the driver door is closed and no other doors have been opened.

FIG. 9 shows an embodiment of a method. As disclosed in the method 900, upon entering the vehicle, a breath detection scan is performed in a 2D plane in an upper portion of the cabin using an IR light source, at 910. This includes the peak centers of individuals in the vehicle being identified and assigned a spatial location (longitudinal length and angle). The peak centers are then monitored with time (based on maxima/minima) for respiration rate and assigned a person type (infant, toddler, adult). If the vehicle engine is not engaged after some time period, or if the vehicle cabin temperature is above 95° F., and peak centers are still detected, an alert is initiated, at 920.

Upon the vehicle engine being engaged, the image detection function or sub-routine is engaged and where confirmation the following based on type and location is performed: Infant to confirm that child is rear-facing (no 2 curved planes detected at scale appropriate to an infant and no 5-point harness or seatbelt detected); Toddler where a check for forward or rear facing based on gaze detection and either 5-point harness detection or seatbelt detection occurs; Adults where checks for seatbelt use and head positioning based on gaze centroid relative to plume center for positioning is performed; and Driver where checks for seatbelt use and head positioning based on gaze centroid relative to plume center for positioning is performed. For Driver, a change in gaze positioning to 2D plume monitored for distraction and a change in total area of 2 curved planes monitored (for head droop) in conjunction with breathing rates to alert for potential drowsiness are also performed.

As further shown in the method 900, once the vehicle engine being disengaged after use, if an infant or toddler were previously detected, a warning or alert will be given so that driver is reminded to check for the infant or toddler, at 940. The sensor will continue scanning for a defined time period after the vehicle is disengaged to further check for an infant or toddler.

FIG. 10 shows another embodiment of a method. The method 1000 comprises detecting individual respiration of each individual within a defined environment regardless of a position of each individual within the defined environment wherein detection is performed at a location unobstructed by components within the defined environment with a respiration detection device, at 1010. The method 1000 further comprises determining at least one of seatbelt usage, driver being distraction and driver drowsiness with an image detection device, at 1020. The method 1000 further comprises at least one of evaluating respiration data to determine a type of individual within the enclosed environment, seatbelt usage, whether a driver is distracted and driver drowsiness with a processor having non-transitory computer readable medium, at 1030. The method 1000 further comprises notifying when at least one individual is detected in the defined environment after at least one other individual has left the defined environment, improper seatbelt usage, driver distraction and driver drowsiness, at 1040.

FIG. 11 shows another embodiment of a method. The method 1100 comprises detecting individual respiration of an individual, with a respiration detection device, within a defined environment regardless of a position of the individual within the defined environment wherein detection is performed at a location unobstructed by components within the defined environment with a respiration detection device, at 1110. The method 1100 further comprises determining placement of the individual within the defined environment with an image detection device, at 1120. The method 1100 further comprises evaluating respiration data gathered by the respiration detection device to determine an individual within the defined environment, at 1130. The method further comprises notifying when the individual is detected in the defined environment after at least one of a defined time period and a reduction in respiration, at 1140.

As disclosed herein, the method 1100 may further comprise capturing an image to confirm a presence of the individual within the defined environment with an image detection device. As discussed above, evaluating respiration data gathered by the respiration detection device to determine an individual within the defined environment may be performed with a processor with non-transitory computer readable medium. The method 1100 may also provide for measuring a carbon dioxide level within the defined environment with the respiration detection device.

Since the type of individual such as, but not limited to a pet, child, adult, etc., may be within the defined environment, determining a type of individual within the defined environment based on the respiration data collected is possible. Notifying within the method 1100 may further comprise providing at least one of an audible alarm, tactile alarm visible alarm at least at the defined environment and at a remote computing device.

Though not limiting, when the defined environment is within a vehicle, the method 1100 may further comprise capturing an image to confirm a presence of the individual within the defined environment with an image detection device to determine at least one of seatbelt usage, driver distraction and driver drowsiness of the individual.

Figure 12:
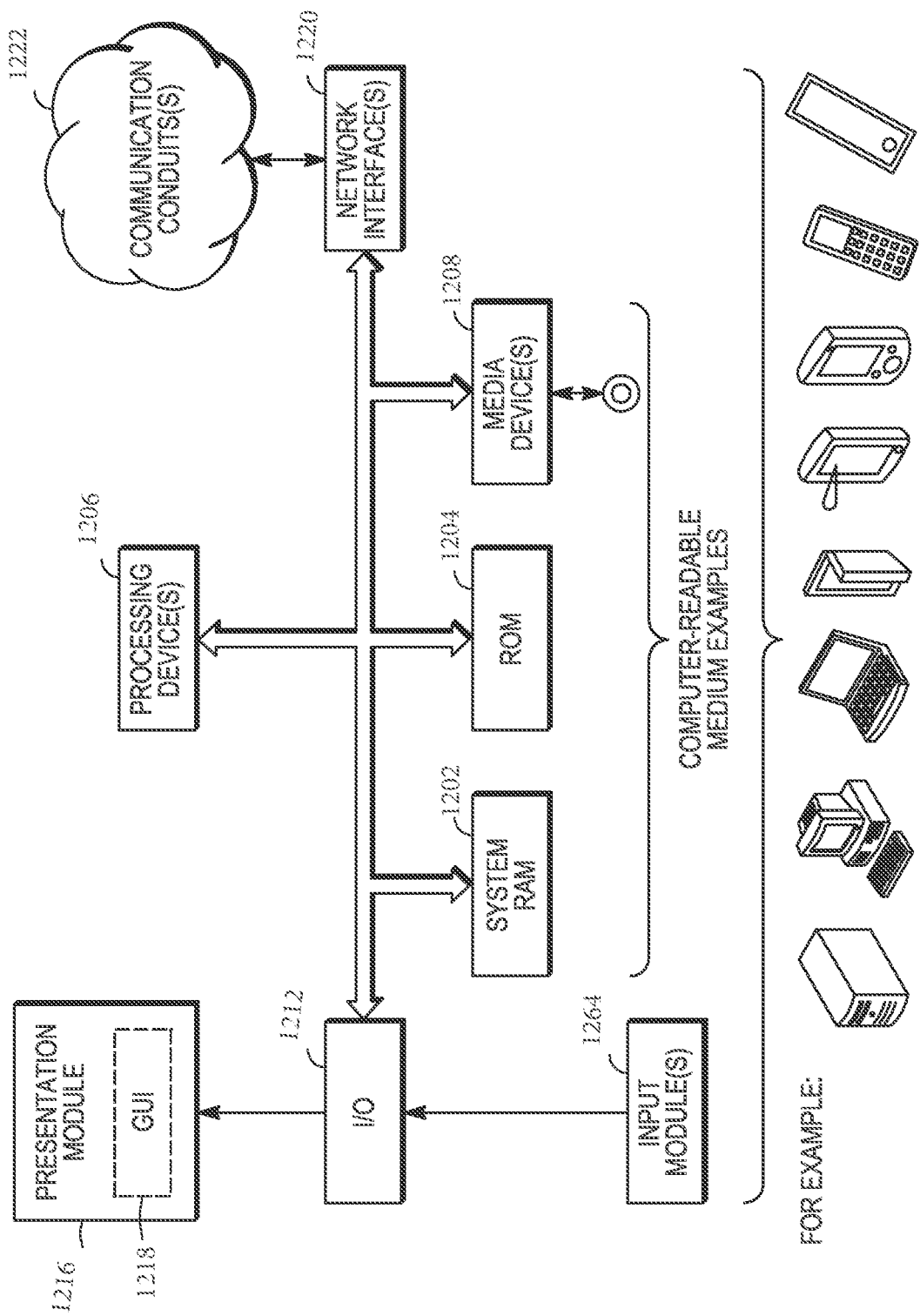
FIG. 12 shows a basic configuration of a computing device.

Referring now to FIG. 12, in a basic configuration, a computing device may include any type of stationary computing device or a mobile computing device. The computing device 1200 may be part of the system 100 to detect individuals in a vehicle and conditions in the vehicle as disclosed above. The computing device 1200 may include one or more processors 1206 and system memory 1202, 1204 in a hard drive. Depending on the exact configuration and type of computing device 1200, system memory may be volatile (such as RAM 1202), non-volatile (such as read only memory (ROM 1204), flash memory, and the like) or some combination of the two. The system memory 1202, 1204 may store an operating system, one or more applications, and may include program data for performing flight, navigation, avionics, power managements operations such as for space operations.

The computing device 1200 may carry out one or more blocks of a process described herein. The computing device 1200 may also have additional features or functionality. As a non-limiting example, the computing device 1200 may also include additional data storage devices 1208 (removable and/or non-removable) such as, for example, magnetic disks, optical disks, or tape. The computer storage media may include volatile and non-volatile, non-transitory, removable and non-removable media implemented in any method or technology for storage of data, such as computer readable instructions, data structures, program modules or other data. The system memory, removable storage and non-removable storage are all non-limiting examples of computer storage media. The computer storage media may include, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data, and which can be accessed by computing device. Any such computer storage media may be part of device.

The computing device may also include or have interfaces 1214 for input device(s) (not shown) such as a keyboard, mouse, pen, voice input device, touch input device, etc. The computing device 1200 may include or have interfaces for connection to output device(s) such as a display, speakers, etc. The computing device 1200 may include a peripheral bus 1212 for connecting to peripherals. The computing device 1200 may contain communication connection(s) 1222 that allow the device to communicate with other computing devices, such as over a network or a wireless network. By way of example, and not limitation, communication connection(s) may include wired media such as a wired network or direct-wired connection, and wireless media such as acoustic, radio frequency (RF), infrared and other wireless media. The computing device may include a network interface card to connect (wired or wireless) to a network.

Computer program code for carrying out operations described above may be written in a variety of programming languages, including but not limited to a high-level programming language, such as C or C++, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD).

The embodiments may be configured for use in a computer or a data processing apparatus which includes a memory, such as a central processing unit (CPU), a RAM and a ROM as well as a storage medium such as a hard disc.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general-purpose computer, but rather the special purpose computer programmed to perform the disclosed algorithm.

A general-purpose computer, or microprocessor, may be programmed to carry out the algorithm/steps for creating a new machine. The general-purpose computer becomes a special purpose computer once it is programmed to perform particular functions pursuant to instructions from program software of the embodiments described herein. The instructions of the software program that carry out the algorithm/steps electrically change the general-purpose computer by creating electrical paths within the device. These electrical paths create a special purpose machine for carrying out the particular algorithm/steps.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another. As used herein the expression "at least one of A and B," will be understood to mean only A, only B, or both A and B.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

The invention claimed is:

1. A system, the system comprising:
a respiration detection device configured to detect respiration of an individual within a defined environment regardless of a position of the individual within the defined environment wherein detection is performed at a location unobstructed by a physical barrier within the defined environment;
a processor with a non-transitory computer readable medium configured to evaluate respiration data from the respiration detection device to determine the individual based on a location of the individual within the defined environment;
the processor further configured to determine a signal to noise ratio where the individual is detected in a particular angular detection zone in the defined environment based on a change in the signal to noise ratio at a sequential set of times to determine a type of individual detected; and
a notification device to provide notification when the individual is detected in the defined environment after at least one of a defined time period and a reduction in respiration.

2. The system according to claim 1, further comprising an image detection device to confirm a presence of the individual within the defined environment.

3. The system according to claim 1, wherein the defined environment is within a vehicle.

4. The system according to claim 3, further comprising an image detection device configured to determine at least one of seatbelt usage, driver distraction and driver drowsiness of the individual.

5. The system according to claim 4, wherein the processor with the non-transitory computer readable medium configured to evaluate respiration data f rom the respiration detection device to determine the individual evaluates image data taken by the image detection device to determine at least one of seatbelt usage, driver distraction and driver drowsiness.

6. The system according to claim 5, wherein the notification device provides notifications for when the individual has left the defined environment, improper seatbelt usage, driver distraction and driver drowsiness of the individual.

7. The system according to claim 1, wherein the respiration detection device is further configured to measure a carbon dioxide level within the defined environment.

8. The system according to claim 1, wherein the respiration detection device is configured to detect the respiration of the individual towards an upper area of the defined environment.

9. The system according to claim 1, wherein the respiration data is used by the processor to determine a type of individual within the defined environment.

10. The system according to claim 1, wherein the notification device provides for at least one of an audible alarm, tactile alarms visible alarm at least at the defined environment and at a remote computing device.

11. The system according to claim 1, wherein an amount of respiration is used to determine head placement of the individual.

12. The system according to claim 1, wherein the respiration detection device comprises a dual integrated absorption light detection and ranging subsystem.

13. A method, the method comprising:
- detecting individual respiration of an individual, with a respiration detection device, within a defined environment regardless of a position of the individual within the defined environment wherein detection is performed at a location unobstructed by components within the defined environment with the respiration detection device;
- determining a signal to noise ratio where the individual is detected in a particular angular detection zone in the defined environment based on a change in the signal to noise ratio at a sequential set of times to determine a type of individual detected;
- determining placement of the individual within the defined environment with an image detection device;
- evaluating respiration data gathered by the respiration detection device to determine the individual within the defined environment; and
- notifying when the individual is detected in the defined environment after at least one of a defined time period and a reduction in respiration.

14. The method according to claim 13, further comprising capturing an image to confirm a presence of the individual within the defined environment with the image detection device.

15. The method according to claim 13, wherein evaluating the respiration data gathered by the respiration detection device to determine the individual within the defined environment is performed with a processor with non-transitory computer readable medium.

16. The method according to claim 13, further comprising measuring a carbon dioxide level within the defined environment with the respiration detection device.

17. The method according to claim 13, wherein detecting the individual respiration of the individual is determined towards an upper area of the defined environment.

18. The method according to claim 13, further comprising determining a type of individual within the defined environment based on the respiration data gathered.

19. The method according to claim 13, wherein notifying further comprises providing at least one of an audible alarm, tactile alarm, or visible alarm at least at the defined environment and at a remote computing device.

* * * * *